Patented Nov. 3, 1942

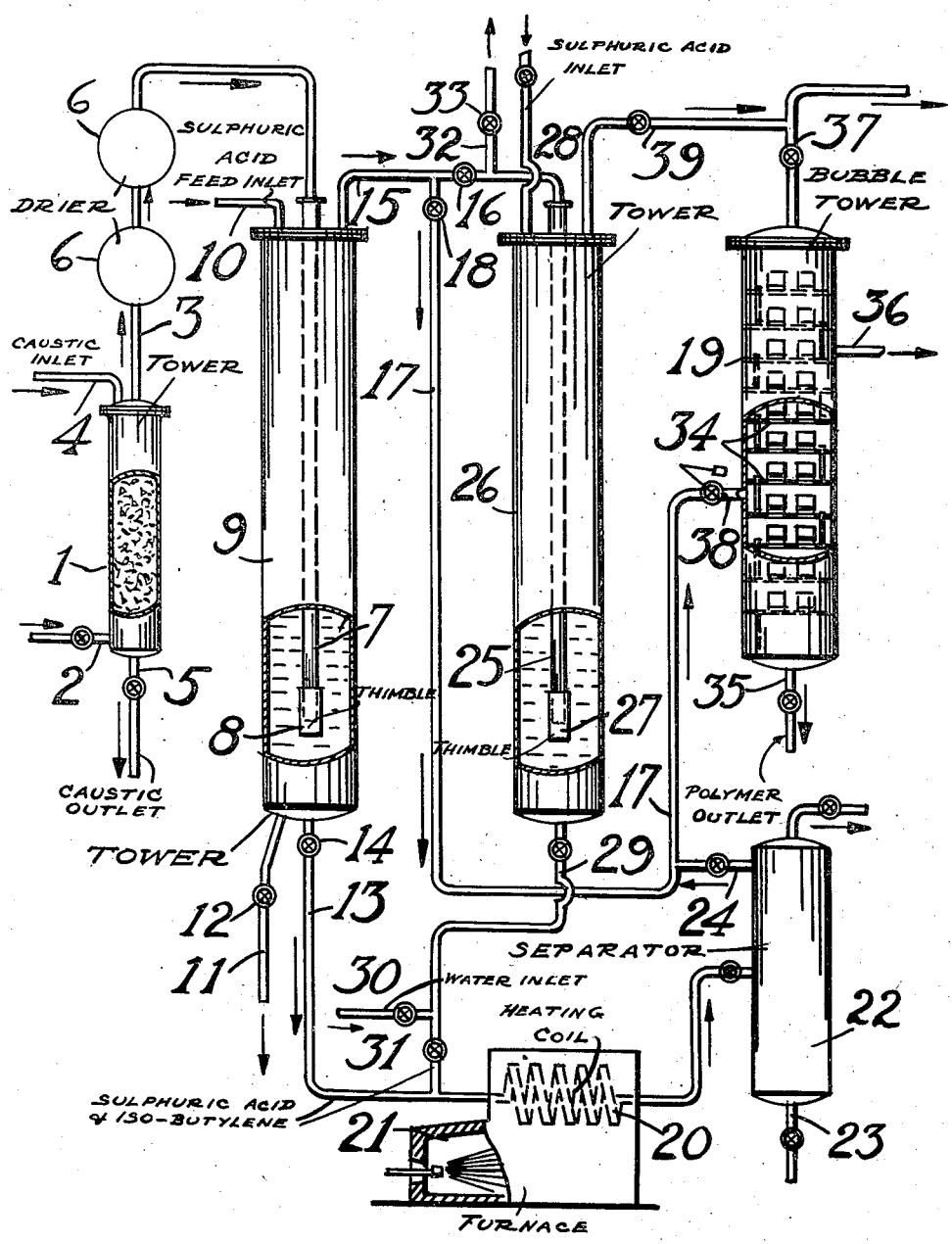

2,300,817

UNITED STATES PATENT OFFICE 2,300,817

FORMATION OF POLYMERS FROM MIXED OLEFINS AND ISO-OLEFINS

William J. Sweeney, Elizabeth, N. J., and Kenneth C. Laughlin, Baton Rouge, La., assignors to Standard Oil Development Company, a corporation of Delaware Application December 31, 1935, Serial No. 56,914
Renewed January 10, 1940

11 Claims. (Cl. 196—10)

The present invention relates to a method for producing polymerization products boiling within the gasoline boiling range from lower molecular weight unsaturated hydrocarbons and to the novel products obtainable thereby. More particularly, the present invention is directed to the acid polymerization of butylenes and hydrocarbon mixtures containing the same, such as refinery gases, particularly, the gases obtained in the stabilization of cracked naphthas, in the liquid phase under conditions suitable for the production of dimers. In its preferred embodiment the present invention is directed to the production of gasoline blending agents of exceptionally high blending octane number, composed very largely of polymers formed by the joining of molecules of normal butylenes with molecules of iso-butylene by polymerization of mixtures of the two by the action of sulphuric acid under selected conditions of temperature and pressure.

There are a number of distinct advantages to the use of sulphuric acid as a condensing agent in this process. To begin with, it is the cheapest of the known condensing agents of the acid type. More important for the present purpose, however, is the fact that it lends itself readily to the attainment of the conditions favoring interpolymerization of normal and iso-olefins and therefore makes possible higher yields of these mixed polymers than are attainable with other condensing agents. In addition it has a quicker action and a more positive influence on the direction of the reaction toward interpolymerization and, therefore, permits higher feed rates and consequently higher throughputs.

It will be apparent from the following detailed description of the process of the present invention that this process is applicable to the polymerization of unsaturated hydrocarbons of the most varied nature and molecular weight. While for practical purposes this process is chiefly of interest in the production of synthetic gasolines and blending agents for other gasolines, its applicability to the production of co-polymers of higher molecular weight, such as those boiling within the kerosene range and within the lubricating oil range will be readily appreciated. Since at present the chief source of olefins suitable for the production of gasoline polymers is refinery gases, such as the C₄ cut, obtained in the stabilization of cracked naphthas, and similar hydrocarbon mixtures made by unsaturating gases of natural origin, the following detailed discussion of the process of the present invention will be directed, for the sake of simplicity, to the application thereof to the C₄ cut.

Stabilizer C₄ cut is a mixture of saturated and unsaturated hydrocarbons, some containing three, but the majority containing four carbon atoms, of which from twenty to thirty-five percent consists of normal and iso-butylenes, the latter comprising up to one-third of the total butylenes. The remainder of the butylenes is composed of α-butylene and β-butylene. The remainder of the stabilizer C₄ cut is made up of saturated hydrocarbons, chiefly normal butane and isobutane, the former being present in between about 3 and 4 times the amount of the latter. In the past it has been the practice in the acid polymerization of this mixture to pass the mixture through 60–65% $H_2SO_4$ at 80°–100° F. and under a pressure determined by the vapor pressure of the C₄ cut. The sulphuric acid absorbs the iso-butylene, permitting the remainder of the C₄ cut to pass through and to be collected for the use of fuel or as an addition agent to gasoline to increase the volatility thereof.

The sulphuric acid solution of the iso-butylene, which was probably present as a sulphate, was heated up to 180°–190° F., whereupon it separated into two layers, the upper of which was composed of di- and tri-iso-butylene. The layers were then separated and the di-iso-butylene recovered by fractionation. The best yield of polymer obtainable according to this procedure was 50–70% based on the iso-butylene content of the initial feed and 6–10% based on the total initial feed.

It has now been found that the yield of total gasoline polymer obtainable from mixed normal and iso-olefins, such as the C₄ cut, can be increased to 200% based on the iso-olefin content of the mixture by contacting the mixture with sulphuric acid in such a manner as to cause the iso-olefins and the normal olefins to interpolymerize. In general, it may be said that this objective is attainable by contacting the mixture of olefins with sulphuric acid at a temperature considerably higher than that previously employed for the selective absorption of the iso-olefin and under a pressure sufficiently high to maintain the mixed olefins in the liquid phase at the temperature employed.

There are several alternative procedures contemplated by the present invention. The preferred procedure is to contact the C₄ cut with 60–75% $H_2SO_4$ at a temperature between 150° and 300° F., preferably between 200° and 225° F., and not usually in excess of 275° F., and under a pressure sufficient to maintain the C₄ cut in the liquid phase, ordinarily at least 200 lbs./sq. in. and not over 600 lbs./sq. in. The operation is most easily performed by introducing the liquid C₄ cut in a finely dispersed condition into the bottom of a tower through which the sulphuric acid passes downwardly. Absorption and condensation apparently occur instantaneously because there is an immediate separation of phases, the polymer occurring in one phase and the sulphuric acid in the other. Polymer is continuously drawn off at the top of the tower and sulphuric acid is continuously drawn off at the bottom.

The fine state of dispersion of the C₄ cut may be induced by causing it to pass through a porous thimble such as an alundum thimble. Alternatively the tower may be packed with a contact material, such as pumice, clay sherds, porcelain balls, etc. and intimate dispersion of the C₄ cut and the acid obtained in this manner.

It has been found that acid life is diminished and yields decreased by the occurrence of mercaptans in the feed. It is desirable, therefore, to wash the feed with caustic prior to its introduction into the acid chamber. In order to preclude variations in acid strength and to thereby avoid lack of uniformity in operating conditions and provide more positive control of the nature of the product it is also advisable to remove moisture from the feed to the acid reaction chamber.

The polymer is withdrawn from the reaction tower and flashed into a fractionating tower in which it is separated into C₄ hydrocarbons, taken off as overhead and consisting mainly of butane, dimers, taken off as a side stream, and trimers recovered as bottoms. The dimers are composed of di-iso-butylene and polymers formed by the interpolymerization of iso-butylene and α-butylene and β-butylene in a proportion of about 1 to 7. The yield varies from 150 to 220% based on the iso-butylene content of the feed stock.

When the mixed polymer is to be used as a gasoline or as an addition to a gasoline it is hydrogenated in a known manner by treatment with hydrogen in the presence of nickel. The hydrogenated mixed polymer has an octane number higher than 90, usually between 96 and 99, and has an octane number blending value of 98–99.

An alternative procedure contemplated by the present invention is to pass the C₄ cut through 60 to 65% H₂SO₄ under conditions favorable to the selective absorption of iso-butylene. The remainder of the C₄ cut is passed through sulphuric acid of at least 87% strength at substantially room temperature and under a suitable pressure for a liquid phase operation. If desired, acid of the same strength can be employed in both stages, the absorption of the normal butylenes being accomplished with this acid by using a higher temperature than that employed in the first stage. The two sulphuric acid solutions are then joined and passed through a heating zone maintained at about 250° F. whereupon a separation of interpolymerized iso- and normal butylenes occurs. The polymers are recovered and fractionated in the usual manner. In some cases it is advantageous to dilute the sulphuric acid solution of the normal butylenes with water prior to its admixture with the solution of iso-butylene. When this expedient is adopted the temperature in the polymerization zone can be lower than 250° F. In any case the pressure in the polymerization zone is greater than the vapor pressure of the C₄ cut.

An additional modification of the process of the present invention is to pass the C₄ cut through sulphuric acid of a suitably selected strength between 65% and 87%, whereby both the iso- and the normal butylenes are absorbed. The sulphuric acid solution of the mixture is then passed, after dilution with water if desired, through the polymerization zone in the manner described above.

The mixture of hydrocarbons which pass through the process substantially unaffected comprise normal butane and some small portions of isobutane. These gases may be advantageously conducted to a dehydrogenation unit where it is contacted with a dehydrogenation catalyst, such as a mixture of difficultly reducible oxides, one of which is preferably an oxide of a metal of group 6 of the periodic system, at a temperature of about 1000° F. The product of this treatment may be then recycled to the feed for the acid contact unit. Alternatively the butane containing gas may be conducted to a thermal polymerization unit where it is subjected to a temperature of the order of 1000° F. and a pressure of the order of 1000 lbs./sq. in. whereby a further quantity of hydrocarbons of the gasoline boiling range may be obtained.

In the accompanying drawing the single figure is a front elevation in diagrammatic form of an apparatus suitable for carrying out any of the above described modifications of the process of the present invention. Referring to the drawing in detail, 1 represents a tower packed with suitable filling material and provided with an inlet line 2 for C₄ cut, an outlet line 3 for C₄ cut, an inlet line 4 for caustic, and an outlet line 5 for caustic. Line 3 conducts the C₄ cut through a series of driers 6 of any desired construction into tube 7, the lower end of which is covered by an alundum thimble 8 and which is mounted in a tower 9 which is provided with a feed line 10 for the introduction of sulphuric acid. Tower 9 is also provided at its lower end with an outlet 11 controlled by a valve 12 and an outlet 13, controlled by a valve 14. At the upper end of tower 9 is an outlet 15 provided with a valve 16 and connected at a point in front of valve 16 with a line 17 controlled by a valve 18.

When the first described embodiment of the process is being carried out valve 14 in line 13 is closed. Sulphuric acid is introduced through line 10 and withdrawn through line 11 and after purification and replenishment, if necessary, is recycled to line 10. Polymer and unconverted C₄ cut leaves tower 9 through line 15, valve 16 is closed and valve 18 is opened and the mixed polymer and initial material is conducted through line 17 and flashed into bubble tower 19.

When the second described embodiment of the process of the present invention is being carried out valve 12 in line 11 is closed and valve 14 in line 13 is opened. Sulphuric acid containing absorbed iso-butylene is then conducted through line 13 to heating coil 20 mounted in furnace 21 and thence to separator 22 which is provided with a line 23 for the withdrawal of acid and a line 24 for the withdrawal of polymer. Unconverted C₄ cut containing normal butylenes leaves tower 9 through line 15. Valve 18 is closed and valve 16 is opened, whereupon the unconverted C₄ cut passes to tube 25 which is mounted in acid tower 26 and has its lower end covered by an alundum thimble 27.

In tower 26 sulphuric acid is introduced through line 28 and sulphuric acid containing absorbed normal butylenes is withdrawn from the bottom through line 29 through which it is conducted to line 13 and mixed with the sulphuric acid containing absorbed iso-butylene recovered from tower 9. Line 29 is also connected to line 30 provided with valve 31 through which water may be added to the sulphuric acid solution leaving tower 26.

When the third modification of the process of the present invention is being carried out, valve 12 in line 11 is closed and valve 14 in line 13 is opened. A sulphuric acid solution of both iso- and normal olefins leaves tower 9 through line 13, passes through coil 20 into separator 22, from which the separated polymer passes through line 24 into line 17 and thence into bubble tower 19. Unconverted $C_4$ cut leaves tower 9 through line 15 and may be withdrawn from the system through line 32 provided with valve 33.

Tower 19 contains conventional fractionation equipment 34, is provided at its lower end with a bottoms withdrawal line 35, on one side with a side stream line 36 and has at its upper end an overhead withdrawal line 37. Adjacent tower 19 in line 17 is a pressure reducing valve 38. Unconverted $C_4$ cut leaving tower 26 in the second modification of the process may be conducted to line 37 by line 39.

It is apparent that various changes may be made in the apparatus illustrated without departing from the scope of the present invention. Moreover, various modifications of the process of the present invention in addition to those already described may be carried out in the apparatus illustrated or in a modified form thereof. It is therefore to be understood that the apparatus illustrated and the description of various specific modes of operation possible in that apparatus are offered with no intention of defining the limits of the present invention.

To show the effect of variations in composition of feed stock, concentration of acid, temperature, feed rate and degree of dispersion of the feed stock in the acid and to demonstrate the utility of the process of the present invention and the nature of the products obtainable thereby, the following examples are submitted.

Example 1

56 liters of a $C_4$ cut containing 29% by volume of unsaturates, 6.6% of the total feed being iso-butylene, was contacted in the course of 3½ hours with 1.4 liters of 75% $H_2SO_4$ in a contact tower of the type illustrated, but containing a packing of pumice in addition to the alundum thimble. An average temperature of 170° F. was maintained. The pressure was held at 380 lbs./sq. in. 3.725 liters of a polymer constituting a yield of 170% of the iso-butylene contained in the initial feed and containing 60% of polymers boiling within the gasoline range were obtained.

The gasoline polymer mixture had an octane number of 85 and an octane number blending value of 115. When hydrogenated the polymer had an octane number of 96.2 and an octane number blending value of 99.

Example 2

12 liters of a $C_4$ cut containing 28% unsaturates, iso-butylene constituting 7.5% of the total feed, were contacted in a tower of the type illustrated in the course of an hour with 6 liters of 71% sulphuric acid. 1.365 liters of a polymer, constituting a yield of 190% based on the iso-butylene content of the feed stock and containing 70% of gasoline polymers was obtained. The yield of gasoline polymers was 133% based on the iso-butylene content of the feed. This polymer mixture had an octane number of 84, an octane number blending value of 112 and, when hydrogenated, an octane number of 95.

During this run an average temperature of 200° F. and a pressure of 350 lbs./sq. in. were maintained. No loss of acid was encountered.

Example 3

68 liters of a $C_4$ cut containing 23.7% of unsaturates, iso-butylene constituting 5% of the total feed, were contacted in a tower of the type illustrated in the course of 6 hours with 6 liters of 71% $H_2SO_4$ at an average temperature of 200° F. and under a pressure of 355 lbs./sq. in. a yield of 5.6 liters of polymer constituting 206% by weight of the iso-butylene contained in the initial feed and containing 78% of gasoline polymers was obtained. The yield of gasoline polymers was 161% by weight of the iso-butylene content of the initial feed.

Example 4

42 liters of a $C_4$ cut containing 23.7% of unsaturates, iso-butylene constituting 5% of the total initial feed, were contacted in a tower of the type illustrated in the course of 4 hours with 6 liters of 67% $H_2SO_4$ at an average temperature of 200° F. and under a pressure of 350 lbs./sq. in. A yield of 3.275 liters of a polymer, constituting 195% by weight of the iso-butylene content of the initial feed and containing 88% of gasoline polymers was obtained. The yield of gasoline polymers was 171% by weight of the iso-butylene content in the initial feed. These polymers when hydrogenated had an octane number of 90.3.

Example 5

46 liters of a $C_4$ cut containing 23% of unsaturates, iso-butylene constituting 6.1% of the total initial feed, by volume, were contacted in a tower of the type illustrated in the course of 5.5 hours with 6 liters of 71% $H_2SO_4$ at a temperature of 225° F. and under a pressure of 350 lbs./sq. in. A yield of 4.6 liters of a polymer, constituting 204%, by weight, of the iso-butylene content of the initial feed and containing 75% of gasoline polymers, was obtained. The gasoline polymer yield was 153%, by weight, of the iso-butylene content of the initial feed.

Example 6

33 liters of a $C_4$ cut containing 22.7% of unsaturates, by volume, iso-butylene constituting 6%, by volume, of the total initial feed, were contacted in a tower of the type illustrated in the course of 3.5 hours with 5.5 liters of 73% $H_2SO_4$ at an average temperature of 225° F. and under a pressure of 325 lbs./sq. in. A yield of 3.1 liters of a polymer, constituting 201%, by weight, of the iso-butylene content of the initial feed and containing 75% of gasoline polymers, was obtained. The yield of gasoline polymers was 151%, by weight, of the iso-butylene content of the initial feed.

Example 7

38 liters of a $C_4$ cut containing 22.7% of unsaturates, by volume, iso-butylene constituting 6%, by volume, of the total feed, were contacted in the course of 4 hours with 6 liters of 65% $H_2SO_4$ at an average temperature of 225° F. and under a pressure of 350 lbs./sq. in. A yield of 3.93 liters of polymer, constituting 215%, by weight, of the iso-butylene content of the initial feed and containing 80% of gasoline polymers, was obtained. The yield of gasoline polymers was 172%, by weight, of the iso-butylene content of the initial feed. The gasoline polymers had an octane number of 84 and an octane number blending value of 115. After hydrogenation the gasoline polymers had an octane number of 94.1.

Example 8

62 liters of a $C_4$ cut containing 25.1%, by volume, of unsaturates, iso-butylene constituting 6.7%, by volume, of the total initial feed were contacted in the course of 8 hours with 6 liters of 75% $H_2SO_4$ at an average temperature of 240° F. and under a pressure of 385 lbs./sq. in. A yield of 5.38 liters of a polymer, constituting 1.62% by weight of the iso-butylene content of the initial feed and containing 65% of gasoline polymers, was obtained.

Example 9

454 liters of a $C_4$ cut containing 30.2%, by volume, of unsaturates, iso-butylene constituting 8.2%, by volume, of the total feed, were contacted in the course of 50 hours with 5.5 liters of 68.5% $H_2SO_4$ at an average temperature of 235° F. and under a pressure of 380 lbs./sq. in. A yield of 42.6 liters of polymer, constituting 139%, by weight, of the iso-butylene content in the initial feed and containing 75% of gasoline polymers, was obtained. The yield of gasoline polymers was 104%, by weight, of the iso-butylene content in the initial feed. At the end of the operation the strength of the acid had dropped to 54.7%.

Example 10

258 liters of a $C_4$ cut containing 29%, by volume, of unsaturates, iso-butylene constituting 8.3%, by volume, of the total feed, were contacted in the course of 27 hours with 5.5 liters of 66.7% $H_2SO_4$ at an average temperature of 240° F. under a pressure of 380 lbs./sq. in. A yield of 28.36 liters of polymer constituting 156%, by weight, of the iso-butylene content of the initial feed, and containing 72% of gasoline polymers, was obtained. During the treatment 4.5 liters of acid were consumed and the acid strength dropped to 61.5%.

Example 11

488 liters of a $C_4$ cut containing 25.4%, by volume, of unsaturates, iso-butylene constituting 7.8%, by volume, of the total feed, were contacted in a tower containing no alundum thimble but packed with pumice in the course of 56 hours with 3.5 liters of 78.5% $H_2SO_4$ at an average temperature of 240° F. and under a pressure of 380 lbs./sq. in. During the second 12 hours of the run the yield of polymer was 185% by weight, of the iso-butylene content in the initial feed. From this point on the yield decreased due to loss and dilution of acid. From the whole run the yield of 43.8 liters of polymer, constituting 140%, by weight, of the isobutylene content of the initial feed and containing 67% of gasoline polymers, was obtained.

When, under the same conditions, the feed is washed with caustic to remove mercaptans and dried before contact with the acid and the acid is replenished from time to time to keep its volume and strength constant, the yield of polymer is 210%, by weight, of the iso-butylene content of the initial feed. Without these preliminary steps, 2.5 liters of acid were consumed and its strength dropped to 53.8%.

In all cases the gasoline polymers obtained had an octane number ranging from 80 to 87 and an octane number blending value ranging from 105 to 120. These polymers, after hydrogenation, had an octane number ranging from 90 to 99 and an octane number blending value ranging from 96 to 99.5. An examination of the distillation curves of the gasoline polymers produced indicates that they contain from 8 to 25% of di-iso-butylene, 30 to 80% of octenes formed by interpolymerization of iso-butylene and normal butylene and from 10 to 25% of higher polymers. Inspections of the products obtained by the procedure described in several of the above examples are as follows:

|  | Example No. | | | | | | | |
| --- | --- | --- | --- | --- | --- | --- | --- | --- |
|  | 3 | 4 | 6 | 7 | 8 | 9 | 10 | 11 |
| A. P. I. gravity | ---- | 59.3 | 57.0 | ---- | 54.0 | 60.3 | 58.1 | 60.3 |
| I. B. P., °F | 109 | 111 | 113 | 111 | 117 | 102 | 108 | 94 |
| 5% @ | 169 | 152 | 154 | 158 | 144 | 156 | 152 | 137 |
| 10% @ | 203 | 183 | 186 | 196 | 189 | 202 | 181 | 172 |
| 20% @ | 228 | 220 | 230 | 228 | 235 | 229 | 221 | 223 |
| 30% @ | 234 | 230 | 245 | 236 | 252 | 236 | 230 | 238 |
| 40% @ | 240 | 235 | 252 | 244 | 276 | 246 | 237 | 249 |
| 50% @ | 246 | 238 | 263 | 252 | 288 | 250 | 243 | 264 |
| 60% @ | 254 | 243 | 288 | 263 | 324 | 265 | 254 | 292 |
| 70% @ | 272 | 252 | 324 | 287 | 358 | 316 | 270 | 345 |
| 80% @ | 340 | 276 | 361 | 342 | 374 | 356 | 320 | 356 |
| 90% @ | 390 | 356 | 387 | 383 | 395 | 370 | 340 | 365 |
| F. B. P., °F | 390 | 382 | 411 | 416 | 444 | 375 | 354 | 367 |
| Recovery, percent | 92 | 95.5 | 96.5 | 96 | 95.5 | 90.5 | 97.0 | 92.0 |
| Residue, percent | 1.0 | 1.0 | 1.0 | 1.0 | 0.5 | ---- | 0.2 | 0.4 |
| Sulfur, percent | 0.5 | ---- | ---- | ---- | ---- | 0.57 | 1.47 | ---- |

Although the gasoline polymers are suitable for use directly as fuels, they exhibit their greatest utility as blending agents for aviation fuels. For example, the octane number of a straight run aviation naphtha having an initial octane number of 74 can be increased to 100 by the addition of 40 to 50% of the hydrogenated gasoline polymers produced in accordance with the present invention and 3 cc. of lead tetraethyl. Of course, in cases where unsaturated constituents in a motor fuel are not objectionable, the polymeric mixture as produced is a more effective blending agent than the hydrogenated polymeric mixture.

In addition to the specific disclosure of operating conditions given above, the following general observations are noteworthy. Indications are that the yield of total polymer is increased by the employment of temperatures within the upper range specified and by the employment of acid of a strength approximating the middle of the specified range. On the other hand there appears to be a definite tendency for the percentage of gasoline polymers in the total polymer formed to be greatest when acid of a strength in the lower half of the indicated range is employed. In some cases, therefore, it may be advantageous to so operate as to sacrifice yield of total polymer in favor of an increase in the production of gasoline polymers, in which case unreacted mono-olefins can be recycled through the acid tower. It is also to be observed that the greater the intimacy of the admixture of the initial material with the treating acid, the greater will be the yield of polymer.

The nature, objects and advantages of the present invention having been thus described and amply illustrated by specific working examples, which are not to be taken as definitive of the scope of said invention, what is claimed as new and useful and is desired to be secured by Letters Patent is:

1. A process for producing a liquid polymer of gasoline boiling range which comprises contacting a mixture of iso- and normal butylenes in a liquid phase with sulphuric acid at a temperature at which substantially only isobutylene is absorbed, contacting the residual olefinic mixture with stronger sulphuric acid of a strength sufficient to absorb the normal butylenes, combining the two acids with their absorbed olefins and heating the mixture to a temperature of between 150 and 300° F.

2. A process for producing a liquid polymer of gasoline boiling range which comprises contacting a liquid mixture containing iso- and normal butylenes with sulphuric acid of strength and at a temperature at which substantially only isobutylene is absorbed, contacting the residual olefinic mixture with sulphuric acid of the same strength at a higher temperature to absorb the normal butylenes, combining the separate batches of sulphuric acid with their absorbed butylenes and subjecting the mixture to a temperature between 150 and 300° F. under a pressure sufficiently high to maintain the olefins in a liquid state.

3. A process according to the claim 1 in which the acid strength of the mixed acids is adjusted by the addition of water to 60-75% $H_2SO_4$ prior to being subjected to the elevated temperature.

4. A process for producing a liquid polymer of gasoline boiling range which comprises subjecting a mixture of iso- and normal butylenes to the action of sulphuric acid of a selected strength between 65 and 85% $H_2SO_4$ at a temperature high enough to cause absorption of both the iso- and normal olefins in said acid and subjecting the acid containing the mixed olefins to a temperature between 150 and 300° F.

5. A process for producing liquid co-polymers of iso and normal butylenes boiling in the gasoline range, which comprises subjecting a gaseous mixture containing iso and normal butylenes to the action of 65-87% sulfuric acid at a temperature sufficiently high to cause the absorption of both iso and normal butylenes, heating the sulfuric acid solution to a temperature between 150 and 300° F. while maintaining a pressure between 200 and 600 pounds per square inch, and separating the liquid polymers from the sulfuric acid.

6. A process for producing liquid co-polymers of iso and normal butylenes boiling in the gasoline range, which comprises passing a gaseous mixture containing iso and normal butylenes through 60-65% sulfuric acid at a temperature between 80 and 100° F. at which substantially only isobutylene is absorbed, thereafter passing the remaining gaseous mixture through sulfuric acid of at least 87% strength at substantially room temperature, both absorption stages being carried out under pressure sufficient to retain the absorbed material in liquid phase, combining the two sulfuric acid solutions and heating the mixture to a temperature of about 250° F. at which interpolymerization of iso and normal butylenes occurs, and separating the liquid polymers formed from the sulfuric acid.

7. A process for the production of a liquid polymer of the gasoline boiling range from a mixture of normally gaseous hydrocarbons containing iso- and normal butylenes and a predominance of hydrocarbons having 4 carbon atoms to the molecule, which comprises heating the mixture to a temperature between 170° and 300° F. while maintained at a pressure of at least 200 lbs./sq. in. and passing the liquid mixture thereby obtained through a body of sulfuric acid of 60 to 75% concentration likewise maintained at a temperature between 170° and 300° F. and under a pressure of at least 200 lbs./sq. in., separating the hydrocarbon mixture from the sulfuric acid and separating the polymers from the hydrocarbon mixture.

8. A process for the production of a liquid polymer of the gasoline boiling range from a mixture of normally gaseous hydrocarbons containing iso- and normal butylenes and a predominance of hydrocarbons having 4 carbon atoms to the molecule, which comprises heating the mixture to a temperature between 170° and 300° F. while maintained at a pressure of at least 200 lbs./sq. in. and passing the liquid mixture thereby obtained through a body of sulfuric acid of 60 to 75% concentration likewise maintained at a temperature between 170° and 300° F. and under a pressure of at least 200 lbs./sq. in., separating the hydrocarbon mixture from the sulfuric acid, separating the polymers from the hydrocarbon mixture and recycling the resulting polymer-free hydrocarbon mixture to the sulfuric acid polymerization step with the fresh feed containing isobutylene and normal butylenes.

9. An improved process for converting hydrocarbons of a $C_4$ cut to higher boiling products normally liquid in character, comprising passing the $C_4$ cut through a body of sulfuric acid of at least 87% concentration at substantially room temperature and under a pressure sufficient to maintain the hydrocarbons in the liquid phase during reaction, and withdrawing the hydrocarbon products from the acid.

10. In a process for converting hydrocarbons of an isobutylene-free stabilizer $C_4$ cut obtained in the stabilization of cracked naphthas to produce normally liquid hydrocarbons by condensing at least a portion of the constitutents of said stabilizer $C_4$ cut under sufficient pressure to maintain the hydrocarbons in the liquid phase during reaction with sulfuric acid and removing the normally liquid hydrocarbons from the sulfuric acid, the steps comprising condensing said stabilizer $C_4$ cut constituents in the presence of sulfuric acid of at least 87% concentration at substantially room temperature.

11. In a process for converting refinery $C_4$ cuts obtained from cracking processes to higher boiling hydrocarbons of the gasoline boiling range by condensing at least a portion of the constituents of said cuts in successive steps with two bodies of sulfuric acid of different concentrations wherein the hydrocarbon layer is separated from the acid layer after each contact stage with the sulfuric acid and normally liquid hydrocarbons are recovered after the second stage, the improvements comprising employing 60% to 65% sulfuric acid in the first stage and sulfuric acid of at least 87% concentration in the second stage and introducing substantially all undissolved hydrocarbons from the first stage into the second stage with intimate contact of hydrocarbons and acid and at substantially room temperature.

WILLIAM J. SWEENEY.
KENNETH C. LAUGHLIN.